United States Patent [19]

Ingraham

[11] 4,182,382
[45] Jan. 8, 1980

[54] THERMOPLASTIC RESIN-COATED METALLIC SUBSTRATE AND THE METHOD OF PRODUCING THE SAME THROUGH USE OF A POLYAMIDE ADHESIVE LAYER

[75] Inventor: Glen E. Ingraham, Lebanon, N.J.

[73] Assignee: Colorguard Corporation, Raritan, N.J.

[21] Appl. No.: 636,565

[22] Filed: Dec. 1, 1975

Related U.S. Application Data

[63] Continuation-in-part of Ser. No. 546,701, Feb. 3, 1975, abandoned.

[51] Int. Cl.$^2$ ............... B05D 7/20; B29F 3/10; B32B 15/02; B32B 15/08
[52] U.S. Cl. ............... 140/3 R; 156/321; 156/331; 256/33; 256/45; 256/46; 264/135; 264/174; 264/237; 427/409; 427/435; 428/383; 428/401; 428/458; 156/244.12; 427/207 A; 427/434 D
[58] Field of Search ............... 428/383, 401, 458; 427/409, 434, 435, 207; 156/244, 321, 331; 260/18 N; 256/33, 45, 46; 264/135, 174, 237, 178 R; 140/3 R

[56] References Cited

U.S. PATENT DOCUMENTS

| | | | |
|---|---|---|---|
| 2,471,752 | 5/1949 | Ingmanson | 156/244 |
| 2,736,897 | 2/1956 | Parsons | 156/244 |
| 2,891,876 | 6/1959 | Brown et al. | 428/383 |
| 3,135,620 | 6/1964 | McGrath et al. | 427/434 |
| 3,220,882 | 11/1965 | Lavin et al. | 428/383 |
| 3,239,598 | 3/1966 | Olson et al. | 428/383 |
| 3,377,303 | 4/1968 | Peerman et al. | 260/18 N |
| 3,389,010 | 6/1968 | Burch | 427/434 |
| 3,398,164 | 8/1968 | Rogier | 260/18 N |
| 3,449,273 | 6/1969 | Kettenring et al. | 260/18 N |
| 3,454,412 | 7/1969 | Stokes | 260/18 N |
| 3,514,312 | 5/1970 | Gardiner | 428/383 |
| 3,795,540 | 3/1974 | Mildner | 428/383 |
| 3,802,908 | 4/1974 | Emmons | 427/409 |
| 3,823,045 | 7/1974 | Hielema | 156/244 |

*Primary Examiner*—J. C. Cannon
*Attorney, Agent, or Firm*—Daniel J. Reardon

[57] ABSTRACT

A metallic substrate and an outer thermoplastic resinous coating are bonded to one another by a resinous polyamide hot melt adhesive prepared by condensation of an unpolymerized amide-forming dicarboxylic-containing compound or polymeric fatty acid with a diamine of the formula

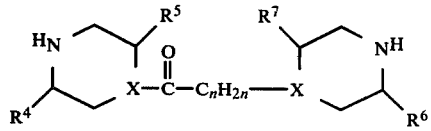

wherein each of $R^4$, $R^5$, $R^6$ and $R^7$ is a hydrogen atom or an alkyl radical; X is a nitrogen atom or a carbon atom bearing a single hydrogen substituent and n is an integer of from 1 to 6 inclusive. The adhesive is first applied to the metal substrate with sequential deposition of the thermoplastic resinous outer coating.

50 Claims, 4 Drawing Figures

THERMOPLASTIC RESIN-COATED METALLIC SUBSTRATE AND THE METHOD OF PRODUCING THE SAME THROUGH USE OF A POLYAMIDE ADHESIVE LAYER

This application is a continuation-in-part of application Ser. No. 546,701 filed Feb. 3, 1975, now abandoned, and entitled "A THERMOPLASTIC RESIN-COATED METALLIC SUBSTRATE AND THE METHOD OF PRODUCING THE SAME".

The coating of metallic substrates with an unbonded ply of plasticized thermoplastic resin has been well established commercially heretofore. The incorporation in the resin coating compositions of various standard anti-oxidants, light stabilizers and other conventional additives has resulted in coated metallic materials manifesting a flexibility without cracking, an impact hardness and resistance to abrasion which makes them particularly useful in a variety of applications including chain-link fence.

The metallic substrate of these coated materials is rendered vulnerable however, where a single-ply of unbonded plastic is present, because of the relative ease with which the resin coating can be stripped from the substrate, a particular concern, for example, where the coated material is chain-link fence and where this material is used in areas subject to the activity of vandals, such as heavily industrialized locations, public playgrounds and the like.

The bonding of certain thermoplastic resin coatings to a metallic substrate has been known to reduce this ease of removal. Bonding has been accomplished, illustratively, by treating wire, for example, with a primer heated to an elevated temperature and the composite of wire and primer passed through a fluidized bed of vinyl resin powder. The wire substrate used commercially in the practice of this latter process has been found to be ungalvanized steel. Inherent in this process, additionally, has been the formation of a microporous coating of limited thickness, i.e., about 7-10 mils, and this vinyl coating has been found to evidence reduced resistance to ultra-violet radiation over a sustained period. The relative thinness of the coating which can be achieved by this method has been found to permit corrosive atmospheres even in the absence of removal of the coating. This vulnerability is, of course, of particular significance where the substrate is, illustratively, ungalvanized steel. The production of vinyl coated metallic substrates employing plastisols or organosols of vinyl chloride resins has also been projected, but the combination of steps including particularly the removal of diluents from the coating and the absorption of plasticizers in the fusion phase tend to render the processes uneconomic, both by reason of the reduced speeds at which, for example, wire must pass through the coating step, e.g., up to about 300 feet per minute, and the high temperature baking ovens necessary for fusion, utilizing high levels of electric energy.

Securing a plastic composition to a metal element is disclosed specifically and by way of further illustration in U.S. Pat. No. 3,795,540. The bonding of an extruded plastic cover of polyvinyl chloride, rubber, impregnated paper or preferably polyethylene, for example, is suggested by this reference using a copolymer of ethylene and an ethylenically unsaturated carboxylic acid, particularly ethylene-vinyl acetate copolymer. This reference is not concerned with a product capable of being produced at high speeds in a continuous process and incorporating a significantly superior bond of coating to substrate. The formation of an adhesive-coated substrate and a substrate to which the polyethylene polymer is thereupon applied is undertaken under inherently slow moving conditions in which the adhesive must be extruded onto the substrate. Thus, the adhesive employed provides a bond between a protective polymeric coating such as poly (vinyl chloride) and a metallic substrate which is inadequate particularly for high-speed metal forming operations; for example, the production of wire products such as chain-link fence.

A further method suggested heretofore for producing a metal component coated with a bonded plastic composition is that described in U.S. Pat. No. 2,531,169 wherein the patentee describes the deposition upon wire of a phenolaldehyde modified polyvinyl enamel, a thermoset lacquer, as an adhesive, with sequential baking, and, in order to secure the necessary thickness, passing the wire through the enamelling bath and baking oven a number of times, after which the enamelled wire is transmitted through a vinyl dispersion or plastisol with heating of the latter coating as well. This latter coating step is also repeated several times. This method is obviously cumbersome and uneconomic. This patent suggests that extrusion techniques are unsuitable for deposition of thin plies of plastic material because of the tendency to damage the undercoat previously placed on the substrate and because of nonuniformity in the resulting layer.

Certain of these disadvantages elucidated, illustratively, in the disclosure of U.S. Pat. No. 2,531,169 are apparent in U.S. Pat. No. 3,532,783 wherein a polyethylene coating is attached by means of a high density polyethylene modified with maleic acid to a wire substrate. This latter patent suggests that polyvinyl chloride may be substituted for polyethylene if a suitable adhesive can be found. The adhesive suggested is a vinyl chloride-vinyl acetate copolymer that is deposited only from solution, and sold, illustratively, by Union Carbide Corporation under the trade name, VMCH. Under normal application this vinyl composition is air dried or baked to eliminate residual solvents. However, even if force dried, the desired state for application will be effected only very slowly. Once deposited, in any event, on the metal substrate with a subsequent overcoat layer of plasticized vinyl compound, the adhesive is softened by the plasticizer of the vinyl chloride resulting in poor bond strength. The process described in this patent proceeds inherently at a slow pace because of the necessity to heat the wire substrate that is to be coated in order to effect a proper deposition of adhesive. The solid flake adhesive employed, in addition, presents a material problem in securing a uniform coat, enhancing the dependency of the process on the preheating step.

If, accordingly, a product could be devised comprising a metallic substrate, and particularly wire, and, as a initial layer or ply, a hot melt polyamide adhesive capable of bonding firmly the wire and a further ply of extrudable thermoplastic resin and particularly polyvinyl chloride or copolymers thereof having a uniform thickness sufficient to provide effective and prolonged protection to the wire substrate, a product of prolonged life span would be obtainable, reducing, and indeed, substantially eliminating the replacement now periodically required of materials which are increasingly expensive or unavailable, and thus constitute a significant advance in the state of the art. Similarly, if an economically and technically feasible, continuous high speed system of providing a product such as the foregoing wherein the heat absorbing qualities of the metallic substrate are used to cool the adhesive could be devised, an advance of significant merit would also be effected.

Various and disparate polyamide adhesives (such as disclosed, for example, in U.S. Pat. Nos. 3,449,273 and 3,377,303) have been proposed generally for use with polyvinyl chloride and with metals or other materials but no mode of application, much less one that is economically efficacious, or capable of uniform and continuous performance at high speeds; nor indeed any suggestion as to specific adhesives appropriate for simultaneous application to metals and polyvinyl chloride to secure a permanent bond is apparent in these teachings.

SUMMARY OF THE INVENTION

It is, therefore, a general object of this invention to provide a laminate including a metallic substrate and a protective thermoplastic resinous ply or coating wherein the coating is bonded to the substrate in such a manner as to preserve the composite assembly of coating and substrate over an extended period of time and under extremes of environmental attrition not attainable heretofore.

It is a further object of this invention to provide means for producing, in a continuous process and at speeds up to 2000 feet per minute, a wire to which has been bonded an extrudable thermoplastic resin coating of a thickness sufficient to assure protection against extremes of temperature and humidity, as well as against abrasion and oxidizing agents such as mineral acids, sea water and other dilute solutions of salt and alkali, while conveying an esthetically pleasing effect.

A still further object of this invention is to provide a coated wire such as provided hereinabove which will have a flexibility sufficient so that it may be flexed or bent to form chain-link fence fabric without cracking and in which the thermoplastic resin employed is preferably, and significantly so, polyvinyl chloride having improved resistance to peeling and thus to deliberate human effort to destroy it by cutting of the protective or insulated coating.

Another and particular object of the invention is to provide a method of bonding a vinyl chloride resin composition to a galvanized steel wire suitable for use in chain-like fabric in a high speed process wherein the bonding component is a hot melt polyamide resin containing composition.

Accordingly, a novel metallic-based laminate of unique durability, including significantly improved and effective resistance to attrition by a vast variety of environmental agents and forces and comprising a metallic substrate, a polyamide adhesive applied thereto and having critical parameters of utility and a protective, extrudable thermoplastic resin and particularly a plasticized vinyl chloride resin outercoat permanently bonded by said adhesive to said wire has now been devised. In addition, it has been discovered that the foregoing thermoplastic resin can be bonded to its metallic substrate or core in a uniform thickness at high speeds in a continuous manner by means of a hot melt polyamide resinous adhesive composition; the process employing the heat absorbing qualities of the metallic substrate to cool the hot-melt adhesives for effective bonding at the linear speeds prescribed herein.

DESCRIPTION OF THE PREFERRED EMBODIMENTS

The novel product of the present invention comprises generally a protectively coated metallic substrate and an extrudable thermoplastic resin coating bonded thereto by means of a hot melt resinous polyamide adhesive composition.

Figure 1:
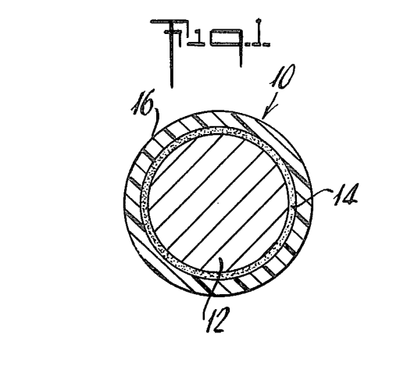
FIG. 1 is a cross-sectional view of the laminnated product prepered according to the present invention.

The metallic substrate treated according to the practice of this invention may vary substantially as to conformation, flexibility and the metal employed. Illustratively, the process herein described has application to relatively smooth metallic surfaces such as copper, aluminum and aluminum-containing metals including aluminum alloys, brass, magnesium, steel, whether galvanized, ungalvanized, bethanized, aluminum coated or high strength, low alloy steels in which the alloy is, for example, chromium, silica, copper, nickel, phosphorus alloy (sold by the U.S. Steel Corporation under the trade name COR-TEN A steel) or a manganese, chromium, vanadium alloy (sold by U.S. Steel Corporation as COR-TEN B steel), or steel surface-treated with phosphoric acid for example; and whether in the form of tubing, H-beams, web constructions, flat plate, cable, filament or wire strands, and the like. The invention herein described has particular and unique application, however, to wire having most desirably a smooth, nodule-free surface as shown in FIG. 1, and that paid out at high speeds from a coil which, after coating is completed, may be conveniently reformed as a coil.

The preferred substrate is galvanized wire suitable for use in the manufacture of chain-link fence wherein the wire substrate is produced, according to processes well known to those skilled in the art, from hot-rolled rods of controlled quality steel. The rods are cold drawn through dies to reduce the diameter of the rod while increasing its length. The cold drawing contributes desirable properties of higher tensile strength and increased stiffness. The resulting wire is then conventionally heat dip galvanized using slab zinc.

While the dimensions of the substrate to be coated are not narrowly critical, where wire is, for example, being coated, preferred limits have been found where, illustratively, the wire is to be used in making chain-link fence having a cross-sectional diameter within the range of about 0.076 inch to about 0.192 inch. Indeed, the invention is especially practicable for use with normally rigid wire of this diameter and having, in addition, a tensile strength of 65,000 to 120,000 psi.

The vinyl resins forming the protective coating are commercially available vinyl halide, and particularly vinyl chloride, homopolymers, as well as copolymers containing at least 75 percent by weight of vinyl chloride and up to about 25 percent by weight of one or more other polymerized comonomers. Illustrative of the vinyl comonomers for use in the foregoing copolymers are vinyl esters of the following general formula:

(I)

wherein R is a lower alkyl moiety and one preferably of from 1 to 4 carbon atoms. Illustrative of the comonomers are vinyl acetate, vinyl butyrate and vinyl propionate.

The vinyl resins thus employed in the practice of this invention provide the most significantly effective bond according to the practice, and under the conditions, achieved hereunder in combination, by way of illustration, with excellent protective properties including resistance to abrasion, weathering oxidation and attack by a variety of other chemicals while being relatively inexpensive and easily handled.

Other significantly less preferred extrudable thermoplastic resins which may also be used, however, in the practice herein described include the polyamides, such as nylon-6 and nylon-12, which are pigmented and stabilized for long outdoor exposure.

The foregoing vinyl chloride homopolyers and copolymers are combined with plasticizer and preferably mixtures thereof, in an amount by weight of about 25 to about 40, and preferably about 28 to 32, parts for every 100 parts of resin (phr). Included among these plasticizers are liquid plasticizers among which are the alkyl and alkoxy alkyl esters of dicarboxylic acids or the esters of a polyhydric alcohol and a monobasic acid, and more specifically. phthalate plasticizers, such as dioctyl phthalate, butyl octyl phthalate, di-2-ethylhexyl phthalate, di-isodecyl phthalate, N-octyl phthalate, dinonyl phthalate, diisooctyl phthalate, butyl lauryl phthalate, butyl benzyl phthalate, and ethyl phthalylethyl glycolate; dibasic acid ester derivatives such as dioctyl adipate, dioctyl azelate, dioctyl sebacate, dibutyl sebacate and glyceryl stearate. Also contemplated as plasticizers are phosphates such as trioctyl phosphate, triphenyl phosphate and tricresyl phosphate; as well as chlorinated fatty acid esters, alkyl epoxy stearates, epoxides of soya bean oil fatty acid, and epoxy linseed oil.

A wide variety of plasticizers can be employed in the vinyl polymer by virtue of the particular adhesives employed herein which are substantially insoluble in the commonly employed vinyl resin plasticizers.

Other conventional components include stabilizers and pigments, normally from about 1 to 9 phr., and preferably about 3.5 to 5 phr. thereof. These components are well known within the field and commercially available. The stabilizers employed particularly are thermal and light stabilizers, such as, illustratively, benzophenone and benzotriazole derivatives usually in an amount by weight of about 0.05 to 0.3 phr., and dibasic lead phosphite or cadmium and zinc salts in an amount by weight of about 0.05 to 0.3 phr. Pigments, employed in amount of 0.0001 to 3.0 phr., are also well known and include, for example, phthalocyanine green, phthalocyanine blue, carbon black and titanium dioxide.

The resulting plasticized polyvinyl chloride resin compositions contain most desirably, no fillers, extenders or other extraneous matter. The colors or pigments are stabilized with conventional stabilizers as aforesaid, have a light fastness that shall withstand a minimum Weather-O-Meter exposure of 4000 and up to 5000 hours without any deterioration (Test equipment operating Light and Water Exposure Apparatus Carbon—Arc Type) ASTM D 1499, E 42 Type and 649 as applied to wire and pipe coating respectively. The extrusion grade semi-rigid vinyl resin utilized will have most desirably a maximum specific gravity of 1.30 to 1.32 (ASTM D 792); a hardness of about Durometer A 75 to 95, Shore A durometer and preferably about 90 to 95; a tensile strength of about 1500 to 3500 (pounds per square inch gauge) psig and about 270 to 280 percent elongation (ASTM D 412). This protective vinyl resin is characterized by high abrasion resistance, maximum deformation of 15% at 120° C. (Underwriter Laboratories Test Procedure) under a 500 gram load and compression cut through of 1500 psig to 1800 psig and preferably 1700 to 1800 psig (Bell Laboratory Test Procedure).

The vinyl chloride resin coating thus formulated can be applied to the metallic core or wire under the conditions recited herein including exceptionally high speed with uniformity, from a conventional extruder in effective thickness to achieve a protectively coated wire having all of the desired properties necessary for imparting an extended useful life to the product of the invention under vigorous conditions to which, for example, chain-link fence, as well as other products formed of the insulated and protected metallic substrates produced according to the invention, are subjected.

The hot melt polyamide adhesive compositions employed in the practice herein described are high molecular weight polymeric polyamide compositions thermally stable as melts in the Brookfield melt viscosity ranges recited hereinbelow and produced preferably and substantially from one or more unpolymerized difunctional amide-forming dicarboxylic compounds or polymeric fatty acids with one or more diamines as described hereinafter.

The unpolymerized difunctional amide-forming dicarboxylic acids contemplated for use in preparing the polyamides useful in the practice of the present invention are embraced by the general formula:

II or compounds hydrolyzable thereto and including the anhydrides or halides (preferably the chlorides) of the acids corresponding to formula II, wherein each of $R^1$ and $R^2$ is hydrogen, an alkyl group containing from 1 to 6 carbon atoms or an aryl, and usually in this event, an aromatic hydrocarbon, radical containing from 6 to 8 carbon atoms; and $R^3$ is an aliphatic, (straight or branched chain), preferably saturated radical of of from 2 to 20 carbon atoms or, and indeed less desirably, a cycloaliphatic radical containing from 4 to 20 carbon atoms or an aryl, normally an aromatic hydrocarbon, radical containing from 6 to 10 carbon atoms. $R^3$ is preferably a straight chain alkylene radical of 4 to 12 carbon atoms; and most desirably from 5 to 7 carbon atoms. Illustrative of the copolymerizing dicarboxylic acids coming within the foregoing structural formula II are succinic acid, adipic acid, sebacic acid, terephthalic acid, isophthalic acid, phthalic acid, naphthalene dicarboxylic acid, 1,4-cyclohexane dicarboxylic acid and 1,3-cyclohexane dicarboxylic acid, and preferably pimelic acid, suberic acid, and most desirably, and indeed uniquely so, it is believed, azelaic acid.

The polymeric fatty acids employed in reaction with the diamines described herein to produce the polyamide hot melt adhesive used in the practice of the invention are those formed predominantly of dimeric fatty acid. For the purpose of this discussion the term "fatty acid" or "fat acid" is intended to encompass monobasic aliphatic acids, and to include saturated, ethylenically unsaturated and acetylenically unsaturated monocarboxylic acids, whether synthetic or naturally occurring. The terms "monomer" or "monomeric fatty acid," "dimer" or "dimeric fatty acid," and "trimer" or "trimeric fatty acid", or equivalent terms, are intended to describe the unpolymerized monobasic monomeric fatty acids or derivatives present in polymeric fatty acids; the dimeric fatty acids formed by the dimerization of two fatty acid molecules; and the residual higher polymeric forms composed primarily of trimeric acids or derivates (containing usually some higher polymeric forms) respectively.

The term "polymeric fatty acid" or grammatical variations thereof, as used herein is intended to be generic to polymerized acids obtained from one or, normally, more fatty acids and is intended to include the saturated, ethylenically unsaturated, and acetylencially unsaturated, natually occurring and synthetic fatty acids referred to hereinabove and specifically those containing from 8 to 24 carbon atoms.

Further illustrative of the foregoing fatty acids and polymerized fatty acids are those described in U.S. Pat. Nos. 3,454,412 and 3,377,303.

The significantly preferred polymeric fatty acids employed in this invention are fractionated polymeric fatty acids having in excess of about 90 percent, and most particularly those having at least 95 percent, by weight of the total fat acid present incorporated in the form of the dimer acid. The remaining weight percent is composed substantially of monomeric acid and some higher polymeric forms. Significantly preferred fatty or fat acids for use in the practice herein defined, that is, specifically, the preparation of polymeric fatty acids, are ethylenically unsaturated monobasic aliphatic acids, containing from preferably about 10 to 24 carbon atoms, and most desirably 16 to 20 carbon atoms. Of these the most preferred are linoleic acid and oleic acid. Mixtures of these acids are found in tall oil fatty acids, mixtures which provide a convenient source for preparation of the polymeric fatty acids employed herein.

Illustrative compositions (on a weight percent basis) of commercially available polymeric fatty acids, based on unsaturated $C_{18}$ tall oil fatty acids that are subject to fractionation before use in forming the polyamides employed in the practice of the invention are:

$C_{18}$ monobasic acids (monomer): 5–15%
$C_{36}$ dibasic acids ("dimer"): 60–80%
$C_{54}$ (and higher) tribasic acids ("trimer"): 10–35%

The preferred dimer acid cuts (containing greater than 90 or 95 weight of dimer) percent referred to hereinabove are, illustratively and desirably, fractionated from the foregoing mixtures by standard high vacuum distillation or solvent extraction methods.

These acids are reacted, in the formation of the polyamides employed herein, either as the acid per se or as an equivalent derivative capable of forming amides in a reaction with a diamine, such as the lower alkyl alcohol ester, wherein the alkyl moiety contains from about 1 to 8 carbon atoms, of polymeric fatty acids.

The fatty acid or derivative is fractionated by, for example, conventional distillation or solvent extraction methods. They may optionally be partially hydrogenated to reduce unsaturation using hydrogen pressure in the presence of a hydrogenated catalyst in accordance with methods well known to those skilled in the art to which this invention pertains.

The unpolymerized difunctional dicarboxylic amide-forming compounds of formula II above can also be admixed with the polymeric fatty acids described hereinabove in forming the polyamide adhesives of the invention if desired. Preferred for use in these mixtures are the polymerized fatty acids and unpolymerized dicarboxylic amide-forming compounds indicated as preferred where reaction of members of each of these groups with the amide-forming diamines of the invention is described hereinabove. The proporation of unpolymerized dicarboxylic compound, preferably an acid, and most particularly azelaic acid, in mixtures such as the foregoing will normally constitute at least 50 weight percent of the total acid content, including any of the compounds of foregoing formula II and the polymeric fatty acids, incorporated in the polyamide adhesives utilized herein.

For the purpose of this invention, monomeric, dimeric and trimeric fat acid contents are defined further by a micromolecular distillation analytical method. The method is that of Paschke, R. E., et al., J. Am. Oil Chem. Soc, III1 (No. 1) 5, (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is based on the residue.

The diamine employed in condensation with one or more of the foregoing unpolymerized difunctional compounds of formula II or polymerized fatty acids described herein is one defined by the formula:

(III)

wherein each of $R^4$, $R^5$, $R^6$ and $R^7$ is a hydrogen atom or an alkyl radical and particularly a lower alkyl radical X is; a nitrogen atom or a carbon atom bearing a single hydrogen substituent, i.e. CH; and n is an integer of from 1 to 6 inclusive. The moiety, $C_n H_{2n}$ is preferably a saturated straight-chain alkylene radical containing 1 to 2 carbon atoms. Each of $R^4$, $R^5$, $R^6$ and $R^7$ is most desirably selected from a hydrogen atom or a methyl or ethyl radical. Particularly preferred of these amide-forming diamines is N-(N'piperazinylacetyl)piperazine (1-piperazinyl-1-piperazinyl methyl ketone) of the formula:

(IV)

Other illustrative copolymerizable diamines coming within foregoing formula III for use in forming the polyamides of the invention are 4-(N-piperazinylacetyl)piperidine; 4-(4'piperidinylacetyl) piperidine; 4-(N-piperazinyl-3-propionyl) piperidine; 4(N-piperazinyl-3-butyryl)piperidine; N-(4-piperidinyl-4-butyryl) piperazine; N-(N'-piperazinyl-6-hexanyl) piperazine; 4(4'-piperidinyl-5-pentanyl) piperidine; N-(N'piperazinyl-3-propionyl) piperazine, N(4-piperidinylacetyl) piperazine; N-(2-methyl piperidinylacetyl) piperazine; N-(2,5-dimethylpiperazinylacetyl) piperazine; N-(2,5-diethylpiperzinylacetyl) piperazine; 4-[4'-(5-methyl) piperidinyl acetyl]-2-methyl piperdine); 4-(2,5-diethylpiperidinylacetyl)-2',5'-diethylpiperidine; 4-(N-piperzinylacetyl)-2,5-dimethylpiperidine; N-(N'-piperazinylacetyl)-2-methyl piperidine; N-(4-piperidinylacetyl)-2-methylpiperazine; N-[N'-(2,5-dimethyl piperzinyl)-3-hexanyl]-2,5-diethylpiperazine; and 4-[4'(2-methyl-5-ethyl piperidinyl)-4-hexanyl]-5-methyl piperidine.

The polyamides of the invention, where formed by reaction of an unpolymerized difunctional dicarboxylic amide-forming acid, ester or anhydride or halide derivative thereof with one or more diamines such as described hereinabove, are prepared by reaction in a ratio of about 0.7 to 0.5 mol of acid equivalent to each mol of amine using standard operating procedures well known to those skilled in the art.

The reactant diamines used in the practice of the invention are prepared by known and standard procedures and are themselves well known to those skilled in the art. The particularly preferred N-(N'-piperazinylacetyl)piperazine is, for example, produced by raction of chloroacetic acid or an alkali metal chloroacetate, for example, sodium chloroacetate, with piperazine to produce N-piperazinyl acetic acid which upon reaction with thionyl chloride yields the corresponding chloride addition product from which the N-(N'piperazinylacetyl) piperazine is secured by reaction of the addition product with additional piperazine and a weak base such as sodium carbonate, $Na_2CO_3$.

Where the polyamides for use herein are prepared by condensation of the diamines with the foregoing fractionated polymerized fatty acids, the reaction is one of one molar equivalent of amine with about one molar equivalent of carboxyl group. The temperature of the reaction of amine and fractionated polymeric fatty acid is not not narrowly critical but is normally within the range of 150° C. to 300° C. The polyamides are prepared by adding all reactive ingredients to a reaction vessel, where they are heated in an inert gas atmosphere with stirring over a period of time, illustratively, within the range of 1.5 to 3 hours, and preferably about two hours; and under a vacuum of 25 to 30 inches of mercury. The longer duration is employed at the lower reaction temperatures. The polyamide is then cooled rapidly and the desired hot melt adhesive polyamide recovered. The substantially equimolar relation of carboxyl to amine groups in the resulting polyamide provides a polyamide that is essentially neutral. An excess of amine or carboxyl groups is permissible however and within the ambit of the present invention ratios of amine to carboxyl moieties may vary between about 0.9 to 1.1 to 1 respectively.

The polyamides thus prepared may and will normally include the conventional additives referred to, for example, in U.S. Pat. Nos. 3,454,412; 3,398,164; 3,377,303; and 3,449,273.

The polyamide resins for use herein are those effecting a superior bond with the metallic substrate and thermoplastic resinous coating at the temperatures and within the other operating parameters described hereinbelow.

Thus, in order that the resins be readily applied preferably as a liquid and in a thickness necessary for effective bonding of the resin coat and metallic substrate thereby at the high rates of speed defined herein and whether prepared using polymeric fatty acid or unpolymerized dicarboxylic acid component, it is significantly preferred that they manifest a softening point of from about 112° Centigrade (C.) to 138° C. (233° Fahrenheit (F.) to 280° F.) and preferably 135° to 138° C.; a Brookfield melt viscosity of 10 to 100 poises, and preferably 40 to 60 poises, at 210° C.; a tensile strength of from about 400 pounds per square inch (psi) to 500 psi and preferably about 450 psi and a percentage (%) elongation of from 400 to 600, and preferably about 550.

A preferred polyamide formed from condensation of azelaic acid and N-(N'-piperazinyl-acetyl)-piperazine has an inherent viscosity of about 0.41 to 0.45 and most desirably about 0.43, when measured in accordance with ASTM D1243. A 0.28 weight to volume solution of the polyamide, in cyclohexane, is used for the determination of viscosity at 30° centrigrade (C.). The polymer is compression molded as a 6 inch by 6 inch sheet of approximately 0.04 inch thickness at a temperature near its melting point (usually a few degrees lower than the melting point) and at 40,000 lbs. load or higher using cellophane as the parting agent in the mold. From this sheet, test specimens are die-cut to conform the ASTM 1708-59T.

The test specimen is clamped in the jaws of the Instron. Crosshead speed is usually 0.5 inch/minute at 100lbs. full scale load. Chart speed is 0.5 inch/minute. Tensile strength (reference: ASTM D-638-52T) is calculated as $$\text{Tensile strength} = \frac{\text{maximum load in pounds}}{\text{cross sectional area (sq. inch)}}$$

Percent elongation is calculated as:

$$\% \text{ Elongation} = \frac{\text{gage length at break minus gage length at 0 load} \times 10}{\text{gage length at 0 load}}$$

The polyamides employed herein may be, and are preferably, used as such, or may have incorporated therewith conventional additives well known to those skilled in the art, notably inert inorganic fillers such as calcium carbonate, in amounts, for example, up to 40 percent by weight of the adhesive compositon, and standard plasticizers such as ortho and para toluene ethyl sulfonamide. These plasticizers are employed, illustratively, in amounts of up to 5, and preferably up to 3, percent by weight of the total adhesive compositions. The incorporation of fillers and plasticizers, although economically efficacious, tends to lead to a less effective bond. Tertiary amine-containing compounds or other base-forming groups tend to be significantly less preferred in the practice herein described since they are prone, when heated, to cause decomposition of the contiguously disposed outer protecting coating of thermoplastic resin.

The products of the invention and the process by which they are prepared are further illustrated by detailed reference to the accompanying drawing wherein the preferred embodiment of the invention is manifested. Thus, there is shown in FIG. 1 the coated and bonded wire 10 incorporating the metallic substrate 12 preferably formed of galvanized steel, and surrounding this substrate; a continuous ply of hot melt polyamide adhesive 14 as characterized hereinabove and to which is bonded in turn as the exterior ply, a coating, most desirably, of a vinyl halide resin composition 16.

Figure 2:
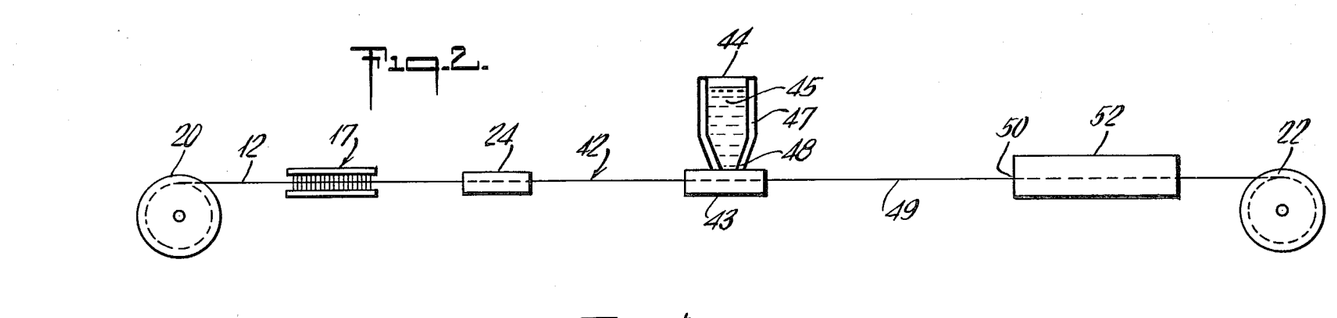
FIG. 2 is a semi-diagrammatic illustration of the method employed according to the invention in producing the product of FIG. 1.

The composite wire product 10 of FIG. 1 is prepared in accordance with a preferred embodiment of the invention as shown in FIG. 2 wherein standard equipment well known to those skilled in the art is employed, except where otherwise expressly indicated. Thus, a continuous metallic wire core 12 is drawn at speeds of up to about 2000 feet per minute through a plurality of treatment zones in which it receives successive resinous plies (designated by the numerals 14 and 16 in FIG. 1) and is subjected to several significant variations in temperature.

More particularly, according to this process a coil of untreated wire 12 is uncoiled from a supply stand or pay-off frame 20 which may be of standard design and drawn through successive treatment zones at a line rate of speed of between about 200 to approximately 2000 feet per minute and preferably within the range of about 800 to about 1500 feet per minute.

Indeed, in the preferred embodiment, the esthetic appeal of the coated product as reflected in the high surface gloss achieved at the higher line rates of speed, is enhanced while decreasing the cost of manufacture of the finished product.

The initially uncoiled wire is, where desirable, first cleaned by conventional means, for example, chemical reagents that is, normally, organic solvents, such as methyl ethyl ketone and toluene, to remove dust, oil or other foreign substances from the substrate or core 12. In a preferred embodiment of this invention a lightly oxidized layer of zinc and, most desirably a substantially monomolecular layer thereof, is present on the wire surface after cleaning is complete. This oxidized surface includes, normally, oxides as well as hydroxides, of zinc which adhere to the wire surface assiduously through the cleaning operation and result in enhanced adhesion of the polyamide resin adhesive composition thereto. The surface of the wire may, optionally, be roughened by mechanical means to enhance adhesion of the polyamide, but it is neither essential nor, indeed, particularly desirable to do so. After the cleaning step is completed, utilizing, in a preferred embodiment, the device of FIG. 4 of the drawing, the wire core 12 is transmitted through a crosshead applicator 32 that constitutes the first treatment zone 24. The fluid adhesive, normally solid at ambient or room temperatures, is introduced by pumping from an extruder or alternatively by gravity feeding from a heated holding tank (350°-400° F.) into the applicator at an elevated temperature sufficient to render it fluid for application to the wire head applicator or die 32. Where an extruder is employed the adhesive is heated in part by the frictional or shearing forces exerted by kneading of the resinous adhesive in the barrel of a conventional extruder and more particularly by heating means disposed in conventional manner in a jacket mounted about the feed screw barrel or other passage or mixing chamber through which the adhesive is conveyed to the applicator head. Conventional hot melt tanks or glue pots, well known to those in the art can be used to supply molten adhesive to the crosshead applicator. The applicator 32 at its opposite ends 35 and 36 is adapted to receive in threaded engagement therewith threaded dies 37 and 38 having axially disposed orifices, the entry orifice 29 and the exit orifice 40 respectively, uniform cross-sectional diameter. The first of these orifices 39 defines the point of entry of the wire 12 into the first treatment zone formed by the annular passage or reservoir 34 and has a larger cross-sectional diameter than the exit orifice 40 which forms a sizing die controlling the thickness of the adhesive coating applied to the wire 12 in the initial treatment zone. Intermediate the opposite ends 35 and 36 of the passage 34 there is disposed an entry port 41 through which the adhesive however fed thereto is transmitted into the passage which thus serves as a reservoir in which the molten adhesive is applied to the advancing wire.

The cross-head applicator is preferred to secure a substantially uniform coating of adhesive on the substrate and employing the particular adhesives herein described it is entirely feasible to do so at the rates of speed coming within the parameters described herein and in a substantially uninterrupted and continuous operation. Illustrative, but less preferred, alternatives are however available for use in the practice of the invention such as the insulated dipping tank 27 shown in FIG. 3 composed preferably of rigid double wall construction, containing an entry orifice 28 with a suitable entry die (not shown) through which the wire 12 is advanced into the tank 27 thus preventing leakage of adhesive present in the molten state within the tank 27 from about the advancing wire 12. Heating elements (not shown) are disposed within or about the walls of the tank in standard manner to secure the elevated temperatures required to melt the normally solid adhesive and achieve the temperature necessary to effect coating of the wire 12. Positioned at the level of the entry orifice 28, but in the wall opposite that 29 in which the entry orifice 28 is defined, is an exit orifice 31 comprising a sizing die of the requisite diameter to provide the desired thickness of adhesive coating 14 on the wire core 12 leaving the first treatment zone.

Figure 4:
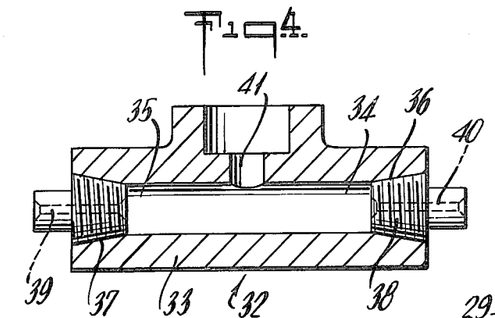
FIG. 4 is a sectional view of another and preferred apparatus for use in the practice of the invention

Whichever of the foregoing means of application is used, however, the temperature to which the normally solid adhesive is elevated to induce the necessary viscosity and resulting adhesion to the metal substrate is normally from about 300° F. to about 450° F. and preferably about 350° F. to about 450° F., the temperatures varying with the particular composition of the adhesive formulation, and the thickness of the adhesive coating 14 to be formed. The preferred range is employed particularly where the limitations on viscosity of the adhesive are more severe, that is, for example, where the crosshead applicator of FIG. 4 is utilized. Within the preferred parameters for practice of the present invention as defined herein, the temperature of the adhesive composition when applied in the first treatment zone is about 350° F. to about 450° F. to effect the continuous uniform coating required. The thickness of the coating is normally within the range of about 0.20 mils (0.00020 inch) to about 5 mils (0.004 inch) and preferably about 3-5 mils (0.003-0.005 inch).

Upon leaving the first treatment zone 24 the adhesive coated wire passes in a substantially linear manner through the ambient atmosphere, which is maintained normally at approximately 65° F. to 78° F., and constitutes a second treatment zone 42, in which the adhesive is returned to a visco-elastic state. This zone has a length normally of about 2 to 20 feet for a residence time of about 0.06 second to 6 sec. and preferably about 4 feet to about 8 feet a residence time of about 0.16 to 0.6 sec. Desirably the adhesive assumes a flexible, soft, semi-solid state best adapted for effective entry into the extrusion die where activation of the adhesive 14 deposited about the wire 12 in the third treatment zone occurs, generally over a distance about 6 feet or a residence time of about 0.24 to 0.45 sec. The ambient air provides the cooling medium of the second treatment zone, together, significantly it has been found with the matallic core 12 which functions as a heat sink for the elevated temperatures imparted to the adhesive in the first treatment zone.

The second treatment zone or cooling span 42 terminates in the third or vinyl resin deposition zone 43. This zone is composed of the annular passage defined by a cross-head die, also designated in this embodiment by the numeral 43. The passage through which the wire is transmitted in this zone may, illustratively, be smooth bore of uniform diameter or tapered to a relatively constricted diameter intermediate the opposite ends of the passage. The method involved is well known to those skilled in the art. The extrusion process involves, by way of illustration, blending vinyl halide resin in the form of a fine powder with plasticizer and other additives to form pellets, usually. This thermoplastic resin composition is then fed through a hopper (not shown) into one end of a conventional plastic extruder from which the plastic is then fed onto a standard screw 45 mounted in the circular passage or barrel 47 with a close clearance between barrel and screw surface of, for example, 0.001 inch per inch of screw diameter. The screw 45 is drawn by a variable speed motor (not shown) which is capable normally of inducing a screw speed of 30 to 100 revolutions per minute (rpm). The barrel 47 is usually heated electrically and together with the heat resulting from the shearing of the pelletized vinyl resin-composition advanced through the barrel 47 from the hopper by the screw 45 attains a molten state as it approaches the extruder head composed of the constricted passage of the adaptor 48 and crosshead die 43. The faster the line speed of the wire to be coated, the faster the speed of screw rotation and the higher the shearing temperature effected within the barrel 47. The temperature induced in the vinyl resin composition in the barrel 47 of the screw feed is sufficient to activate the hot melt adhesive advancing into the crosshead die from the second treatment zone, where the adhesive has been cooled and rendered sufficiently solid to pass unimpeded into the crosshead die without clogging of the latter at and about the point of entry of the adhesive-coated wire into the die.

The temperature attained in the extruder head or die of the third treatment zone is from about 300° F. to about 425° F. and preferably about 350° F. to about 400° F.; temperatures sufficient to secure an effective bond between the vinyl coating and the wire 12 without degradation of the adhesive or vinyl resin composition.

The coating applied in the crosshead die of the extruder is most desirably about 0.015 inch to about 0.025 inch in thickness where the product wire is to be woven into chain-link fence fabric.

The coated wire product 10 is then advanced into the final treatment zone 49 prior to being rewound on the take-up reel 22 driven by conventional electric motor or other drive means (not shown).

The final treatment zone comprises an intermediate air space or heat transfer zone 50 of about 2 to 20 feet or more in length and preferably about 5 to 15 feet, and a cooling bath or trough 52 through which cold water is circulated. The further removed from the cross-head die 43 the water-containing cooling bath 52 is positioned within the recited parameters, the better the bonding of the vinyl resin coating 16 secured to the metallic substrate or core 12, since greater opportunity is given for activation of the adhesive 14 and a consequently improved bond. The residence time in the heat transfer zone 50 will vary within the range of from about 0.08 second (sec.) to 6 sec. with a preferred range of about 0.2 sec. to 1.2 sec.

The cooling bath 52, containing desirably a circulating stream of water operating at a temperature within the range most desirably of 50° F. to 70° F., serves to assure solidification of the adhesive and vinyl resin plies 14 and 16 respectively, so that the product 10 can be recoiled or otherwise stored or used after leaving the bath 52. The residence time in the bath is normally from about 0.05 minute to about 0.25 minute depending upon line speed and the length of the bath.

It has been found, using the polyamide hot melt adhesives described herein, that a substantially uniform adhesion can be secured of the outer coat of thermoplastic resin to the metal substrate without regard for the linear speed of the process. Similarly, the product prepared at transitional speeds to and from the foregoing economically advantageous high rates of speed is neither inferior nor inconsistant with that prepared at high speeds and thus not subject to discard.

Adhesion is, believed to be improved according to the practice of the invention by preheating the metal substrate to a temperature of from 75° F. to 200° F. or indeed 250° F. prior to application of the adhesive in the first treatment zone.

Figure 3:
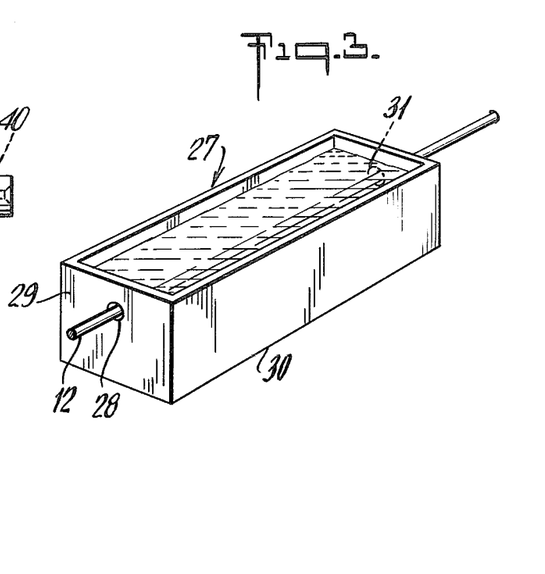
FIG. 3 is a perspective view of one form of apparatus used in the practice of the process according to the invention.

The use of the cross-head applicator is particularly preferred with the polyamide hot melt adhesive as indicated above since it permits the maintenance of smaller volumes of adhesive at the elevated temperatures at which application to the substrate occurs satisfactorily, and thus provides that the adhesive need be maintained at these elevated temperatures for only brief periods of time, thus appreciably reducing the tendency to decomposition of the polyamide adhesive to which it is subject where incorporated, for example, for application in the dip-tank 27 of FIG. 3.

The resinous adhesives thus evolved are characterized by excellent adhesion to the vinyl resins and metallic substrates at the temperatures and within the other parameters set forth herein.

The coated wire combines, as will be evident from the accompanying description, means for producing a product of unusually desirable characteristics in a significantly efficient and inexpensive manner.

The following examples are further illustrative of the invention. In the examples all parts and percentages are by weight unless otherwise expressly indicated.

EXAMPLE 1

The example illustrates the product of wire having a protective coating bonded thereto in accordance with the invention.

A continuous substrate of clean galvanized steel wire 12 having a cross-sectional diameter of 0.106 inch and a tensile strength of 100,000 psig is advanced at a rate of 250 feet per minute through the entry die of a dip tank applicator such as described hereinabove and illustrated in FIG. 3 wherein a polyamide hot melt adhesive composition in the molten state (about 400° F.) is maintained, and is applied to the wire or filament 12 in a thickness of about 0.002 inch.

The normally solid hot melt adhesive is a thermoplastic polyamide resin prepared by charging fractionated polymerized tall oil fatty acids manifesting the following properties upon analysis under gas liquid chromatography:

Saponification Equivalents: 285
Neutralization Equivalent: 290
Monomer: 1.1
Dimer: 98.2
Trimer (and higher polybasic acid residue): 0.7 together with N(N'piperazinylacetyl)piperazine into a reactor equipped with a stirrer, thermocouple and distillation head. One molar equivalent of amine is charged to the reactor for each mole of carboxyl there introduced. The reaction mixture is stirred under nitrogen successively for 1.25 hours at 36° C. (96.8° F.) to 160° C. (320° F.); 0.75 hour at 160° C. (320° F.); 0.5 hour at 160° C. (320° F.) to 250° C. (482° F.); 0.5 hour at 250° C.; and then under vacuum for 2.25 hours at 250° C. The adhesive is characterized by a ball and ring softening point of 138° C.; a tensile strength of 450 psi and a percent elongation of 550.

From the exit orifice die of the cross-head applicator or die (32 of FIG. 4) termed the first treatment zone, the wire is advanced in a substantially linear manner through the ambient atmosphere constituting the second treatment zone 40 having a length of about 4 feet, in which the adhesive coated wire is permitted to cool and solidify. The coated wire is then delivered to the third treatment zone 42 formed by the smooth annular bore of a cross-head die into which molten vinyl chloride resin composition Colorite 9813 Black, a plasticized poly(vinyl chloride) containing low temperature (−20° C.) plasticizer, a mixture of thermal and ultra-violet stabilizers and pigment with no other fillers, extenders or other extraneous matter present, is fed from a conventional screw feed extruder 43.

The vinyl chloride resin composition feed has a light fastness sufficient to withstand (1) a minimum Weather-O-Meter exposure of 4000 hours without deterioration (Test Equipment Operating Light and Water Exposure Apparatus Carbon-Arc Type) ASTM D 1499, E 42 Type E, and (2) an accelerated aging test of 2000 hours at 145° F. without cracking or peeling. The resin has, in addition, a tensile strength of 2700 psi, ultimate elongation of 275%; a specific gravity of 1.30 maximun, a hardness not less than Durometer A 90±5: maximum deformation of 15% at 120° C. under a 500 gram load and a compression cut through of 1500 psi; when measured by the appropriate test procedures recited in the description appearing hereinabove. The screw is rotated in the heated extruder barrel at a rate sufficient to knead the foregoing resin and exert a shearing force adequate, in turn, to induce a temperature in the plasticized resin being advanced in the barrel 45 and the extruder head or die 42 to about 350° F.

The cross-sectional diameter of the die is sufficient to provide a resin coating of 0.021 inch and define an outside diameter of about 0.148 inch to the product wire 10 when the coating operation is complete.

The wire is next passed into the final treatment zone 49 including a cooling trough 52 in which water is circulated. This trough is removed from the die 43 by about fifteen feet in which span the coated wire travels in a linear path through a room temperature atmosphere. In this span the vinyl coating and hot melt adhesive perfect the bond initiated in the vinyl extruder's cross-head die and is cooled sufficiently to avoid accumulation of coating resin on the guide rolls of the trough. The coated wire is then advanced through the trough or dam 52 which is maintained at about 69° F. to 75° F. and the finished product recovered therefrom after a residence time of about 2.5 seconds. This product evidences good adhesion five minutes after its recovery from the final treatment zone and may be stripped from the wire substrate only with difficulty.

EXAMPLE 2

This example illustrates the use of an increased line speed in the practice of the invention.

The procedure of Example 1 is repeated using a line rate of speed in the various treatment zones of 600 feet per minute. The plasticized vinyl resin at the point of application in the cross-head die achieves a temperature of about 390° F. The surface finish is found improved to a glossy condition over that of Example 1.

EXAMPLE 3

This example illustrates the use of a line rate of speed significantly faster than that of Example 1 and 2.

The procedure of Example 1 is repeated using a line rate of speed in the several treatment zones of about 900 feet per minute. The vinyl resin has a temperature of about 370° F. in the cross-head die. The surface gloss is substantially improved over that secured at the lower rates of speed of Examples 1 and 2. The degree of surface gloss secured is significant in that the vinyl resin coating effected is important not only for its protective character but for its esthetic appeal as well, particularly where it is to be employed in the manufacture of chain-link fence.

EXAMPLE 4

This example illustrates the use of a line speed significantly faster than that of the prior examples.

The procedure of Example 1 is repeated using a line rate of speed in the several treatment zones of about 1000 feet per minute. The surface gloss is excellent, and the adhesion to the wire substrate of the vinyl resin coating as good as that secured in Example 3. The outside diameter of the product wire secured under conditions otherwise identical to those recited in Examples 1 to 4 was 0.148 inch, with a vinyl coat of 0.021 inch thickness. The speed of the coating operation is limited by the take-up capability of the apparatus used; not by the effectiveness or speed of application.

EXAMPLE 5

This example illustrates the use of a cross-head die of different construction for application to the wire substrate of the hot melt adhesive.

The procedure of Example 1 is repeated using a line rate of speed of about 500 feet per minute and employing the cross-head applicator of FIG. 4 affixed to the discharge port of a heated holding tank. The entry orifice 39 of the cross-head applicator has a uniform cross-sectional diameter of 0.114 inch to provide a uniform coating of hot melt adhesive of 0.004 inch on the bare wire having a diameter of 0.106 inch.

EXAMPLE 6

This example illustrates the practice of the invention as described in Example 1 employing variable conditions coming there within.

The procedure of Example 1 was employed using a line rate of speed of about 975 feet per minute. The cross-sectional diameter of the wire, the slab zinc surface of which is lightly oxidized and otherwise brush cleaned, is 0.106 inch. The temperature of the dip tank along the path of adhesive application was 400° F. The adhesive was a polyamide of the type, and the preparation of which is, described in Example 1; characterized by a ball and ring softening point of about 138° C.; a Brookfield melt viscosity at 210° C. of about 45 poises; a polymer tensile strength of about 450 psi; and a percent elongation of about 550. The adhesive is deposited on the wire substrate in a thickness of 2 mils. The vinyl resin, identical to that of Example 1 is deposited in the manner therein described, in a thickness of about 21 mils to provide a coated product wire with an outside diameter of about 0.148 inch. The adhesive and vinyl resin coatings deposited are substantially uniform in thickness.

EXAMPLE 7

This example illustrates the practice of the invention as applied to different metallic wire substrate than that employed in the prior examples.

The procedure of Example 6 was repeated substituting an aluminum alloy wire substrate having a cross-sectional diameter of 0.120 inch chemically cleaned to remove oil and other foreign substances from its surface. The adhesive was applied at a temperature of 400° F. in a thickness of about 2 mils to the wire which advanced through the various treatment zones at a rate of 400 feet per minute. The identical plasticized vinyl chloride resin composition of Example 6 was extruded into the resulting adhesive coat in the manner of Example 6 in a thickness of 13 to 14 mils to provide a finished coated wire having an outside or cross-sectional diameter of 0.150 inch. The peel strength of this product was found to be excellent.

The determination of the extent of bonding of vinyl resin coating to the metal substrate described as peel strength where referred to in the foregoing examples is made using a six inch length of specimen wire which is suspended vertically from the grips of a tensile tester. The upper five inches of this wire sample are stripped of thermoplastic resin coating. The other extremity of the wire that is stripped is positioned within the annular orifice or band of adjustable diameter of a steel stripping fixture adapted to receive the wire. The stripping fixture is, itself, mounted in the lower grips of the foregoing tensile tester. The diameter of the orifice is adapted to receive the stripped wire but not the coated portion of the wire which is one inch in length and abuts the lower end of the stripping fixture. The stripping fixture or device is, in performance of the test, lowered under pressure to effect peeling of the bonded resinous coating from the wire substrate. The maximum tensile load or weight necessary to strip the wire, characterized as break-down force is recorded on a load cell of the tensile tester.

EXAMPLE 8

This example illustrates the practice of the invention as described in Example 5 employing a different polyamide hot melt adhesive.

The procuedure of Example 5 is repeated substituting a polyamide resinous hot melt adhesive for application to the wire substrate in the applicator of the first treatment zone. The polyamide is that prepared by reaction of azelaic acid and N-(N'-piperazinylacetyl) piperazine in a molar ratio between 0.5 and 0.7 to 1 respectively in a reaction vessel under an inert atmosphere according to conventional procedures to yield upon cooling a product having an inherent viscosity of 0.43 (using ASTM Procedure D 1243 and employing a 2 percent weight/volume solution of the polyamide in cyclohexanane at 30° C.); and a Brookfield viscosity at 210° C. (410° F.), poise of 0.99 as determined by ASTM procedure D-792.

EXAMPLE 9

This example illustrates the practice of the invention as described in Examples 1 to 4 inclusive using the polyamide condensate of Example 8.

The procedures of Examples 1 to 4 are repeated substituting the polyamide condensate of azelaic acid and N-(N'-piperazinylacetyl)-piperazine of Example 8 for the hot melt adhesives recited in each of the foregoing examples.

Varying the linear speed of application of the hot melt adhesive and vinyl chloride resin coating has been found to leave relatively unaffected the degree of adhesion effected. The adhesion achieved is however significant in any event as measured by the peel strength test procedure described in Example 7.

EXAMPLE 10

This example illustrates the practice of the invention as described in Example 8 and 9 using a polyamide derived from different acid and amine components than those of Example 8.

The procedure of Examples 8 and 9 is repeated using in each instance similarly prepared polyamide condensates but of suberic acid and N-(N'piperazinyl-3-propionyl)-piperazine; wherein the acid and amine are reacted in a molar ratio of 0.5 to 0.7 (acid) to 1 (amine).

EXAMPLE 11

This example illustrates the practice of the invention described in Example 3 hereof but employing a different polyamide hot melt adhesive.

The procedure of Example 5 was repeated using the same apparatus and vinyl resin recited therein, a line speed of about 975 feet per minute and an adhesive application temperature of about 400° F. with extrusion of the vinyl resin onto the adhesive coating at 390° F. but employing the azelaic acid-N(N'piperazinyl acetyl) piperizine condensate of Example 8 as the polyamide hot melt adhesive. The protectively coated wire so produced evidenced an excellent adhesion.

EXAMPLE 12

This example demonstrates the practice of the invention utilizing a pre-heating step.

The procedure of Example 11 was repeated for production of the resin coated wire product except that the clean wire is pre-heated to a temperature of about 150° C. prior to entry thereof into the first treatment zone.

EXAMPLE 13

This example illustrates the practice of the invention as described in Examples 8, 9 and 12 utilizing a different polyamide adhesive.

The procedure of each of Examples 8, 9 and 12 is repeated using a polyamide condensate of pimelic acid and 4-(N-piperidinylacetyl) piperidine.

EXAMPLE 14

This example illustrates the practice of the invention as described in Examples 8, 9 and 12 utilizing a different polyamide adhesive.

The procedure of each of Examples 8, 9 and 12 repeated using a polyamide condensate of azalaic acid and 4-(4'-piperidinylacetyl) piperidine.

EXAMPLE 15

This example illustrates the practice of the invention as described in Examples 8, 9 and 12 utilizing a different polyamide adhesive.

The procedure of each of Examples 8, 9 and 12 repeated using a polyamide condensate of fractionated polymeric fatty acid of Example 1 and 4-(N-piperazinylpropionyl) piperidine.

EXAMPLE 16

This example illustrates the practice of the invention as described in Examples 8, 9 and 12 utilizing a different polyamide adhesive.

The procedure of each of Examples 8, 9 and 12 repeated using a polyamide condensate of fractionated polymeric fatty acid of Example 1 and N-(N'-piperazinylacetyl) 2-methyl piperidine.

EXAMPLE 17

This example illustrates the practice of the invention as described in Examples 8, 9 and 12 utilizing a different polyamide adhesive.

The procedure of each of Examples 8, 9 and 12 repeated using a polyamide condensate of adipic acid and 4-(2',5'-diethylpiperidinyl acetyl)-2,5,-diethylpiperidine.

EXAMPLE 18

This example illustrates the practice of the invention as described in Examples 8, 9 and 12 utilizing a different polyamide adhesive.

The procedure of each of Examples 8, 9 and 12 repeated using a polyamide condensate of 1,4-cyclohexane dicarboxylic acid and 4-[4'-2'-methyl-5'-ethyl piperidinyl)-4'-hexanoyl]-5-methyl piperidine.

EXAMPLE 19

This example illustrates the practice of the invention as described in Examples 8, 9 and 12 utilizing a different polyamide adhesive.

The procedure of each of Examples 8, 9 and 12 repeated using a polyamide condensate of naphthalene dicarboxylic acid and N-[4'-(2'-methyl piperidinyl)acetyl] piperazine.

Various epoxy and acrylic adhesives and zinc chromate primers employed under conditions similar to those recited above evidence normally either slight or no adhesion. Where any adhesion is secured the bond is brittle. Other acrylic resin adhesives such as that sold by Hughson Chemical Company in a two component system under the trade name designation Hughson 521 accelerator #3 (lacquer) modified acrylic adhesive system, exhibited good adhesion but required that the system be run at a very reduced line rate of speed.

It will be evident that the terms of expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. A metallic wire substrate whereon is disposed a protective laminate comprising as a first ply a polyamide hot melt adhesive bonded to said substrate, said polyamide comprising the condensate of

(1) an poly amide-forming dicarboxylic compound having the formula:

$$R^1OOCR^3COOR^2$$

or compounds hydrolyzable thereto, wherein each of $R^1$ and $R^2$ is hydrogen, an alkyl group or an aryl group; and $R^3$ is an aliphatic, cycloaliphatic or an aryl radical; or (2) a polymeric fatty acid having a dimeric fat acid content of at least 90 percent by weight; or mixtures thereof; and a diamine of the formula:

wherein each of $R^4$, $R^5$, $R^6$ and $R^7$ is a hydrogen atom or an alkyl radical; and n is an integer of from 1 to 6 inclusive;

the ratio of said difunctional amide-forming compound to said diamine being within the range of about 0.5 to 0.7 moles of said difunctional compound to each mole of diamine; and the molar equivalent of said polymeric fatty acid to said diamine being from 0.9 to 1.1 of carboxyl groups to each amine moiety present in said diamine;

said polyamide having a melt viscosity of 10 to 100 poises at 210° C.;

and a second ply of an extrudable thermoplastic resin adhering to said substrate by means of said adhesive.

2. A protectively coated metallic wire substrate as claimed in claim 1 wherein said extrudable thermoplastic resin is a plasticized vinyl resin.

3. A protectively coated metallic substrate as claimed in claim 2 wherein said plasticized vinyl resin is present is a thickness of at least 0.007 inch.

4. A chain link fence fabric comprising a protectively coated wire as claimed in claim 3.

5. A protectively coated wire as claimed in claim 2 wherein said vinyl resin is a plasticized polyvinyl chloride comprising 100 parts by weight of vinyl chloride homopolymer and from 25 parts to 40 parts of a plasticizer per hundred parts of homopolymer.

6. A protectively coated wire as claimed in claim 5 wherein said plasticizer is non-migratory with respect to said hot melt adhesive.

7. A protectively coated wire as claimed in claim 2 wherein said vinyl resin is plasticized vinyl chloride homopolymer.

8. A protectively coated wire in accordance with claim 2 wherein said vinyl resin is a copolymer of not less than seventy percent by weight of polymerized vinyl chloride and not more than thirty percent by weight of a vinyl ester of the general formula:

wherein R is a lower alkyl radical.

9. A protectively coated wire as claimed in claim 4 wherein said wire is composed of steel.

10. A laminate as claimed in claim 1 wherein said polyamide comprises the condensate of azelaic acid and N-(N'-piperazinylacetyl)-piperazine.

11. A protectively coated steel wire as claimed in claim 10 wherein said polyamide has a Brookfield melt viscosity of 40 to 60 poises at 210° C.

12. A protectively coated metallic substrate as claimed in claim 10 wherein said metallic substrate is galvanized steel wire; said polyamide adhesive has a softening point of from about 135° C. to 138° C.; a Brookfield melt viscosity of about 0.45 at 210° C.; a tensile strength of about 500 pounds per square inch; and a percent elongation of about 550.

13. A protectively coated metallic substrate as claimed in claim 12 wherein said substrate is galvanized steel wire including an oxidized zinc surface coating.

14. A protectively coated metallic substrate as claimed in claim 10 wherein said substrate is steel wire.

15. A protectively coated metallic substrate as claimed in claim 10 wherein said substrate is galvanized steel wire.

16. A protectively coated metallic substrate as claimed in claim 10 wherein said substrate is aluminum-coated steel.

17. A protectively coated metallic substrate as claimed in claim 10 wherein said substrate is chromium, silica, copper, nickel phosphorus alloy steel.

18. A protectively coated metallic substrate as claimed in claim 10 wherein said substrate is manganese, chromium, vanadium alloy.

19. A protectively coated metallic substrate as claimed in claim 10 wherein said substrate is an aluminum containing metallic material.

20. A protectively coated metallic substrate as claimed in claim 10 wherein said substrate is galvanized steel wire having a cross-sectional diameter of from about 0.076 to about 0.192 inch.

21. A metallic wire substrate as claimed in claim 1 wherein said polyamide comprises a condensate of said polyamide-forming dicarboxylic acid and said diamine.

22. A protectively coated metallic substrate whereon is disposed a protective laminate as claimed in claim 21 where, in said polyamide-forming dicarboxylic compound, $R^3$ is an alkylene moiety of from 5 to 7 carbon atoms.

23. A protectively coated metallic substrate whereon is disposed a protective laminate as claimed in claim 22 wherein said amide-forming dicarboxylic compound is azelaic acid or the methyl ester thereof.

24. A protectively coated metallic substrate, whereon is disposed a protective laminate, as claimed in claim 21, wherein
said amide-forming dicarboxylic compound is azelaic acid or the methyl ester thereof;
said diamine is N(N'-piperazinylacetyl) piperazine;
and said extrudable thermoplastic plasticized vinyl resin in vinyl chloride homopolymer.

25. A protectively coated metallic substrate as claimed in claim 24 wherein
said metallic substrate is galvanized steel.

26. A continuous process for applying and bonding a protective coating to a metallic wire substrate that comprises applying to a rapidly advancing length of said substrate a first ply of a molten polyamide resin hot melt adhesive at a temperature of from 300° F. to 450° F.; said polyamide comprising the condensate of

(1) a polyamide-forming dicarboxylic compound of the formula:

$$R^1OOCR^3COOR^2$$

or compounds hydrolyazable thereto, wherein each of $R^1$ and $R^2$ is hydrogen, an alkyl group or an aryl group; and $R^3$ is an aliphatic, cycloaliphatic or an aryl radical; or (2) a polymeric fatty acid having a dimeric fat acid content of at least 90 percent by weight or mixtures thereof:

and a diamine of the formula:

wherein each of $R^4$, $R^5$, $R^6$ and $R^7$ is a hydrogen atom or an alkyl radical; and n is an integer of from 1 to 6 inclusive; the ratio of said difunctional amide-forming compound to said diamine being within the range of about 0.5 to 0.7 moles of said difunctional compound to each mole of diamine; and the molar equivalent of said polymeric fatty acid to said diamine being from 0.9 to 1.1 of carboxyl groups to each amine moiety present in said diamine; said polyamide having a melt viscosity of 10 to 100 poises at 210° C.; cooling the said adhesive composition to a flow resistant state; extruding a molten extrudable thermoplastic resin composition onto said adhesive composition whereby said adhesive composition is softened and cooling, whereby said thermoplastic resin composition is bonded to said substrate by means of said adhesive composition.

27. A continuous process as claimed in claim 26 wherein said wire is advanced at a rate of from about 200 feet per minute to about 1200 feet per minute.

28. A continuous process as claimed in claim 27 wherein said polyamide resin hot melt adhesive comprises the condensate of azelaic acid and N-(N'-piperazinylacetyl)-piperazine.

29. A continuous process as claimed in claim 28 wherein said polyamide adhesive has a Brookfield melt viscosity of about 45 poises at 210°; a tensile strength of about 500 pounds per square inch; and a percent elongation of about 550.

30. The process of claim 29 wherein said extrudable thermoplastic resin is a plasticized vinyl chloride homopolymer.

31. The process of claim 28 wherein said extrudable thermoplastic plasticized resin employed is a copolymer of vinyl chloride and a vinyl ester having the structure:

wherein R is a lower alkyl radical.

32. The process of claim 31 wherein said vinyl ester is vinyl acetate.

33. The process of claim 30 wherein said temperature at which vinyl chloride homopolymer compound is extruded onto said adhesive coated substrate is about 300° F. to about 450° F.

34. The process as claimed in claim 33 wherein said wire is advanced at about 200 feet per minute to about 1200 feet per minute.

35. The process of claim 34 where said adhesive composition is deposited upon said wire in a thickness of about 1 to about 5 mils and said vinyl chloride homopolymer compound is extruded onto said adhesive coating in a thickness of about 0.015 to 0.025 inch.

36. The process as claimed in claim 28 wherein said wire is substantially nodule-free galvanized steel wire.

37. The process as claimed in claim 28 wherein the melt viscosity of said polyamide is about 40 to 60 at 210° C.

38. The process as claimed in claim 37 wherein said wire is galvanized steel wire having a oxidized zinc surface coating.

39. The process as claimed in claim 38 wherein said wire has a cross-section diameter of from about 0.076 inch to about 0.192 inch.

40. A process for applying a protective coating to a metallic wire and simultaneously bonding said coating thereto that comprises applying, in a first treatment zone, to a rapidly advancing length of said wire a first ply of molten hot melt polyamide adhesive as claimed in claim 26, at a temperature of from 300° F. to 425° F. to effect a bonding of said adhesive to said metallic wire; advancing said adhesive coated substrate to a second treatment zone wherein said adhesive is cooled to a solid, soft, flow-resistant state and thereafter extruding onto said cooled adhesive in a third treatment zone, a molten extrudable thermoplastic plasticized vinyl resin composition, at a temperature sufficient to melt said adhesive and effect a bond between said adhesive and said vinyl resin composition; and thereafter in a fourth treatment zone reducing the temperature of said advancing coated wire to solidify the bonded coating of adhesive and vinyl resin composition; said wire being advanced through said treatment zones at a rate of about 200 feet per minute to about 1200 feet per minute.

41. The process of claim 40 wherein the treatment zones wherein cooling occurs are maintained at about room temperature.

42. The process of claim 40 wherein said fourth treatment zone comprises the ambient atmosphere through which the coated wire is advanced after leaving the extruder, and a trough containing a cooling liquid medium through which said coated wire is advanced from said ambient atmosphere.

43. The process of claim 40 wherein the residence time of said wire in said fourth treatment zone is from about 0.08 seconds to 6 seconds and said zone is maintained at a temperature of from about 50° to 70° F.

44. In the process of manufacturing protectively coated chain link fence fabric, the steps that comprise forming a protectively coated wire substrate as claimed in claim 26.

45. A continuous process for applying and bonding a protective coating to a metallic wire substrate that comprises applying to a rapidly advancing length of said substrate a first ply of polyamide hot melt adhesive at a temperature of from 300° F. to 450° F., said polyamide comprising the condensate of a polyamide-forming dicarboxylic compound having the formula:

or compounds hydrolyzable thereto, wherein each of $R^1$ and $R^2$ is hydrogen, an alkyl group or an aryl group; and $R^3$ is an aliphatic, cycloaliphatic or an aryl radical; and a diamine of the formula:

wherein each of $R^4$, $R^5$, $R^6$ and $R^7$ is a hydrogen atom or an alkyl radical; and n is an integer of from 1 to 6 inclusive;

the ratio of said difunctional amide-forming compound to said diamine being within the range of about 0.5 to 0.7 moles of said amide-forming dicarboxylic compound to each mole of diamine;

said polyamide having a melt viscosity of 10 to 100 poises at 210° C.;

cooling said adhesive composition to a flow resistant state;

extruding a molten extrudable thermoplastic-plasticized vinyl resin onto said adhesive composition whereby said adhesive composition is softened, and cooling, whereby said thermoplastic resin composition is bonded to said substrate by means of said adhesive composition.

46. A process as claimed in claim 45 wherein said vinyl resin is a plasticized vinyl halide-containing resin.

47. A process as claimed in claim 45 where, in said amide-forming dicarboxylic compound, $R^3$ is an alkylene moiety of from 5 to 7 carbon atoms.

48. A process as claimed in claim 47 wherein said amide-forming dicarboxylic compound is azelaic acid or the methyl ester thereof.

49. A process as claimed in claim 45 wherein
said amide-forming dicarboxylic compound is azelaic acid or the methyl ester thereof;
said diamine is N(N¹-piperazinylacetyl) piperazine;
and said extrudable thermoplastic plasticized vinyl resin is vinyl chloride homopolymer.

50. A process as claimed in claim 49 wherein said metallic substrate is galvanized steel.

* * * * *